United States Patent

[11] 3,577,001

| [72] | Inventor | Donald L. Cummins<br>Anderson, Ind. |
|---|---|---|
| [21] | Appl. No. | 872,939 |
| [22] | Filed | Oct. 31, 1969 |
| [45] | Patented | May 4, 1971 |
| [73] | Assignee | General Motors Corporation<br>Detroit, Mich. |

[54] ELECTRIC CRANKING MOTOR AUTOMATIC DISCONNECT AND LOCKOUT CIRCUIT
2 Claims, 1 Drawing Fig.

[52] U.S. Cl. .................................................. 290/38, 290/37
[51] Int. Cl. .......................................... F02n 11/08
[50] Field of Search .......................................... 290/37, 38; 123/179 (BM)

[56] References Cited
UNITED STATES PATENTS

| 3,264,483 | 8/1966 | Alexander | 290/38 |
| 3,415,999 | 12/1968 | Noury | 290/37X |
| 3,443,112 | 5/1969 | Huntzinger | 290/38 |
| 3,476,950 | 11/1969 | Carlson | 290/38 |

*Primary Examiner*—G. R. Simmons
*Attorneys*—Eugene W. Christen, Creighton R. Meland and Richard G. Stahr ABSTRACT: An electric cranking motor automatic disconnect and lockout circuit. The normally open contacts of an electric-cranking-motor-solenoid-operated switch, having the operating coil thereof connected across a source of DC potential through the normally open contacts of an electric relay, are connected in series with the electric cranking motor across the source of DC potential. Upon the closure of an electric switch, an energizing circuit is established for the operating coil of the electric relay across the source of DC potential to close the associated normally open contacts thereof which establish an energizing circuit for the operating coil of the solenoid operated switch. At least a portion of the output potential of an electric generator driven by the cranked engine is transformer coupled across the gate-cathode electrodes of a silicon controlled rectifier, the anode-cathode electrodes of which are connected in parallel with the operating coil of the electric relay. When the generator output potential is of sufficient magnitude to produce gate-cathode current through the silicon controlled rectifier, the resulting anode-cathode current flow therethrough short circuits or shunts sufficient current around the operating coil of the electric relay to substantially deenergize and disenable the operating coil, consequently, the associated normally open contacts open to interrupt the energizing circuit for the operating coil of the cranking-motor-solenoid-operated switch. The silicon-controlled rectifier is maintained conductive while the engine is in the running mode, consequently, the operating coil of the electric relay is maintained disenabled thereby, a condition which prevents the reengagement of the cranking motor while the engine is in the running mode.

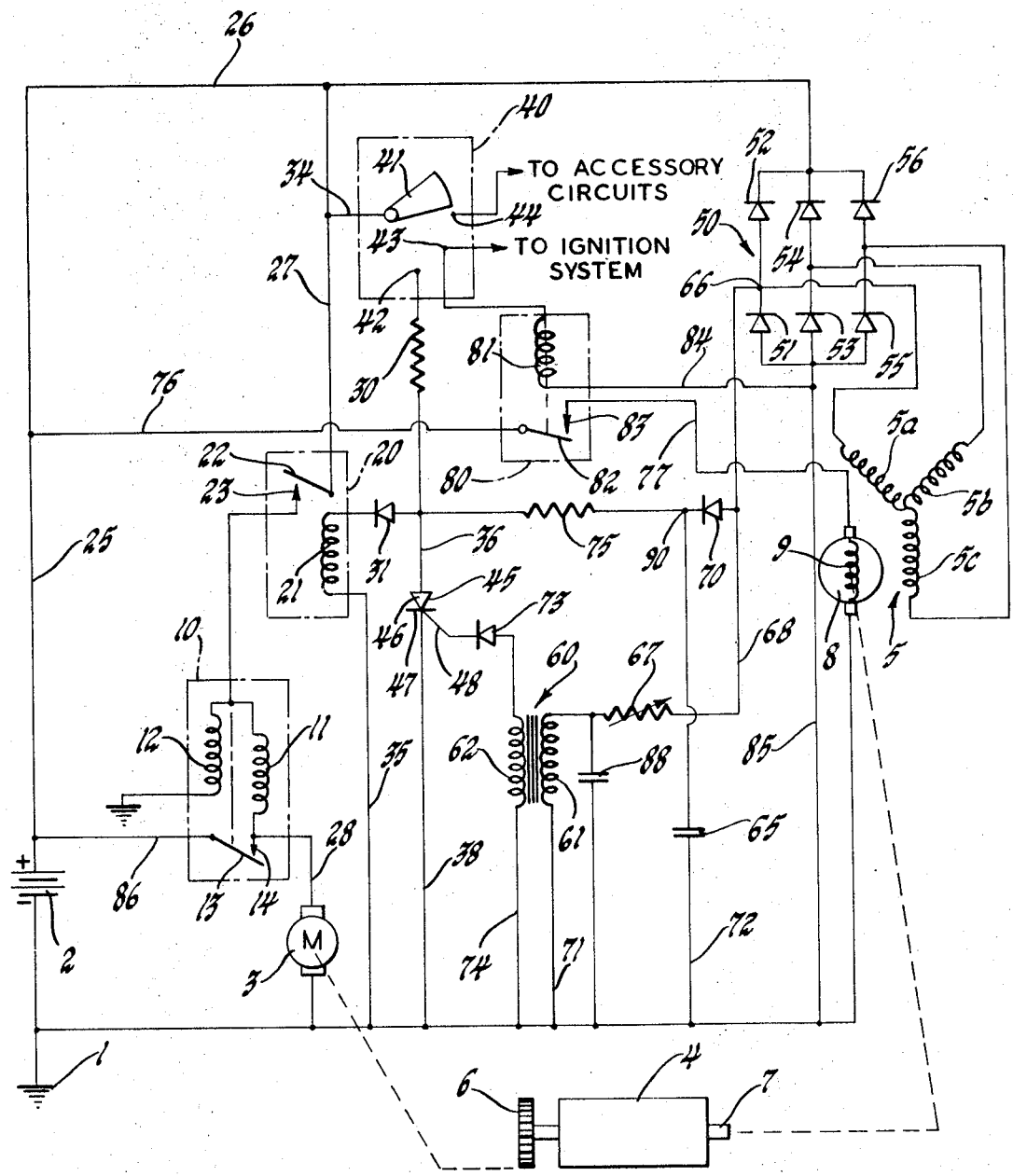

3,577,001

ELECTRIC CRANKING MOTOR AUTOMATIC DISCONNECT AND LOCKOUT CIRCUIT

This invention is directed to an electric cranking motor automatic disconnect and lockout circuit and, more specifically, to a circuit of this type which is responsive to the output potential magnitude of an electric generator driven by the cranked engine to automatically interrupt the cranking-motor-energizing circuit upon engine "start" and to prevent the reenergization thereof while the engine is in the running mode.

Electric cranking motors are frequently employed to start internal combustion engines which are used as a power source for a variety of applications. To prevent serious damage to the engine, the cranking motor and the cranking-motor-engagement mechanism, it is mandatory that the cranking motor be deenergized and disengaged upon engine "start." It is equally important that the cranking motor be not energized while the engine is in the running mode.

Therefore, a circuit which will automatically deenergize the cranking motor upon engine "start" and which will prevent the reenergization of the cranking motor while the engine is in the running mode is desirable.

It is, therefore, an object of this invention to provide an improved electric cranking motor automatic disconnect and lockout circuit.

It is another object of this invention to provide an improved electric cranking motor automatic disconnect and lockout circuit which is responsive to the output potential magnitude of an electric generator driven by the cranked engine to interrupt the cranking-motor-energizing circuit upon engine "start" and to prevent the reestablishment thereof while the engine is in the running mode.

In accordance with this invention, an electric cranking motor automatic disconnect and lockout circuit is provided wherein the energizing circuit for the operating coil of the cranking-motor-solenoid-operated switch is interrupted upon the opening of the normally open contacts of an electric relay connected in series therewith when the operating coil of the electric relay is shunted by the anode-cathode electrodes of a silicon-controlled rectifier which is triggered conductive in response to the output potential of an electrical generator driven by the cranked engine reaching a sufficient magnitude to produce gate-cathode current flow therethrough.

For a better understanding of the present invention, together with additional objects, advantages and features thereof, reference is made to the following description and accompanying single FIGURE drawing which sets forth the electric cranking motor automatic disconnect and lockout circuit of this invention in schematic form.

As the point of reference or ground potential is the same point electrically throughout the system, it has been illustrated by the accepted symbol and referenced by the numeral 1 in the FIGURE.

Referring to the FIGURE, the electric cranking motor automatic disconnect and lockout circuit of this invention is set forth in schematic form in combination with a source of DC potential, which may be a conventional storage battery 2, and electric cranking motor 3 connected thereacross through the normally open contacts of a cranking-motor-solenoid-operated switch 10 having at least one operating coil 11 and two normally open contacts, movable contact 13 and stationary contact 14, an internal combustion engine 4 to be cranked thereby and an electric generator 5 driven by the cranked engine 4.

As conventional electric cranking motors, internal combustion engines and electric generators adapted to be driven by internal combustion engines are well known in the art and, per se, form no part of this invention, in the interest of reducing drawing complexity, each has been symbolically represented in the FIGURE. Cranking motor 3 may be drivably engaged with gear 6 of engine 4 through any method well known in the automotive art and generator 5 may be driven by a belt connecting pulley 7 of engine 4 and rotor 8 of generator 5 in a manner well known in the automotive art.

The cranking-motor-solenoid-operated switch 10, hereinafter referred to as a solenoid-operated switch, is shown in the FIGURE to have two coils 11 and 12. This is a common expedient, particularly in the automotive art, for the purpose of conserving battery power. Coil 11 is the operating or "pull-in" coil which, when energized, closes contact 13 to stationary contact 14 and coil 12 is a "hold-in" coil which maintains movable contact 13 in electrical contact with stationary contact 14 after "pull-in" coil 11 is shorted out by the closed contacts. It is to be specifically understood that a solenoid-operated switch having only one coil may be used without departing from the spirit of the invention.

The electric generator 5 driven by engine 4 is shown in the FIGURE to be a three-phase alternator having three output windings 5a, 5b, and 5c. When field coil 9 is energized by a direct current and rotated with rotor 8, a three-phase potential is induced in output coils 5a, 5b, and 5c. Although the electric generator 5 driven by the cranked engine 4 is shown in the FIGURE to be a three-phase alternator, it is to be specifically understood that the cranking motor automatic disconnect and lockout circuit of this invention is equally satisfactory for use with a single-phase alternator.

Operating coil 11 of solenoid-operated switch 10 is connected across source of DC potential 2 through the normally open contacts, movable contact 22 and stationary contact 23 of an electric relay 20, through a circuit which may be traced from the positive polarity terminal of battery 2, through leads 25, 26 and 27, movable contact 22 and stationary contact 23 of electric relay 20, operating coil 11, lead 28, cranking motor 3 and point of reference of ground potential 1 to the negative polarity terminal of battery 2. "Hold-in" coil 12 of solenoid-operated switch 10 is also connected across battery 2 through the normally open contacts of relay 20.

Operating coil 21 of relay 20 is connected across the source of DC potential 2 through the movable contact 41 and one of the stationary contacts 42 of an electric switch 40, having a movable contact and at least two stationary contacts, through a circuit which may be traced from the positive-polarity terminal of battery 2 through leads 25, 26, 27, and 34, movable contact 41 and stationary contact 42 of electric switch 40, current-limiting resistor 30, diode 31, operating coil 21, lead 35 and point of reference or ground potential 1 to the negative-polarity terminal of battery 2. Diode 31 is included in this energizing circuit for operating coil 21 for the purpose of providing a potential drop to compensate for the potential drop across silicon-controlled rectifier 45 during conduction. This reduces the potential across coil 21 to a value less than the minimum required to maintain contact 22 in electrical contact with stationary contact 23.

The electric switch 40 may be a conventional automotive-type ignition switch having an open or "off" position, in which it is shown in the FIGURE, a "run" position at which movable contact 41 is closed to stationary contacts 43 and 44 and a "crank" position at which movable contact 41 is closed to stationary contacts 42 and 43. As is well known in the art, switches of this type are spring biased to automatically return to the "run" position wherein movable contact 41 is closed to stationary contacts 43 and 44 when the torque applied to the ignition key is released.

To disenable or deenergize operating coil 21 of electric relay 20 upon engine "start" and to prevent the reenergization of operating coil 21 while engine 4 is in the running mode, a silicon-controlled rectifier 45 having an anode electrode 46, a cathode electrode 47 and a gate electrode 48 is provided with the anode-cathode electrodes thereof connected in shunt across operating coil 21 through leads 36 and 38.

For proper operation of the circuit of this invention, it is necessary that at least a portion of the output potential of the generator driven by the cranked engine be applied across the gate-cathode electrodes of silicon-controlled rectifier 45 in a polarity relationship to produce gate-cathode current flow therethrough.

As the generator 5 driven by cranked engine 4 is shown in the FIGURE to be a three-phase alternator, a three-phase diode bridge-type rectifier circuit 50 comprising the parallel combination of three pairs of series connected diodes 51—52, 53—54 and 55—56 is provided for rectifying the output potential thereof.

While generator 5 is producing an output potential, a half-wave-rectified AC output potential appears across the junction between each series-connected pair of diodes of rectifier circuit 50 and point of reference or ground potential 1 and is of a positive polarity at the junction between the diodes with respect to point of reference or ground potential 1.

To apply at least a portion of the output potential of generator 5 across the gate-cathode electrodes of silicon-controlled rectifier 45 in a polarity relationship to produce gate-cathode current flow therethrough and to maintain silicon-controlled rectifier conductive through the anode-cathode electrodes thereof while engine 4 is in the running mode, a coupling transformer 60 having a primary winding 61 and a secondary winding 62, a capacitor 65 and circuitry for applying at least a portion of the output potential of generator 5 across the primary winding 61 of transformer 60 and capacitor 65, in parallel, are provided.

In the FIGURE, one end of primary winding 61 of transformer 60 and one plate of capacitor 65 are connected to junction 66 between series-connected pair of diodes 51 and 52 through resistor 67 and lead 68 and through diode 70 and lead 68, respectively, and the other end of primary winding 61 and the other plate of capacitor 65 are connected to point of reference or ground potential 1 through respective leads 71 and 72. The end of primary winding 61 and the plate of capacitor 65 shown to be connected to junction 66 may also be connected to either the junction between diodes 53 and 54 or the junction between diodes 55 and 56. Secondary winding 62 of coupling transformer 60 is connected across the gate-cathode electrodes of silicon-controlled rectifier 45 through diode 73 and through lead 74 and point of reference or ground potential 1.

Diode 70 prevents capacitor 65 from discharging through the diode bridge rectifier circuit 50 and diode 73 is provided for the purpose of preventing reverse-current leakage through the gate electrode of silicon-controlled rectifier 45.

Capacitor 65 is connected across the anode-cathode electrodes of silicon-controlled rectifier 45 in a polarity relationship to maintain anode-cathode conduction therethrough through resistor 75 and through lead 72 and point of reference or ground potential 1.

Relay 80 having an operating coil 81, a movable contact 82 and a stationary contact 83, is a conventional generator field relay which establishes an energizing circuit for field coil 9 of generator 5 across source of DC potential 2 while electric switch 40 is in either the "crank" or "run" position. Although relay 80 is not a part of the circuit of this invention, one example of the electrical connection of this relay into the overall circuit has been illustrated in the FIGURE in the interest of a complete specification.

Upon the operation of movable contact 41 of electric switch 40 to the "crank" position at which it is in electrical contact with stationary contacts 42, 43, an energizing circuit, previously described, is established for operating coil 21 of relay 20; battery potential is connected across the anode-cathode electrodes of silicon-controlled rectifier 45 in the proper polarity relationship for anode-cathode conduction therethrough and an energizing circuit is established for operating coil 81 of field relay 80 through a common circuit which may be traced from the positive-polarity terminal of battery 2, through leads 25, 26, 27 and 34 to movable contact 41 of electric switch 40 and respective branch circuits which may be thence traced from stationary contact 42 through resistor 30, diode 31, operating coil 21 of relay 20 and lead 35 and through resistor 30, the anode-cathode electrodes of silicon-controlled rectifier 45 and lead 38 and point of reference or ground potential 1 to the negative-polarity terminal of battery 2 and from stationary contact 43 through operating coil 81 of relay 80, leads 84 and 85 and point of reference or ground potential 1 to the negative-polarity terminal of battery 2.

Energized operating coil 21 of relay 20 closes movable contact 22 thereof into electrical contact with stationary contact 23 to complete an energizing circuit, previously described, for operating coil 11 and "hold-in" coil 12 of solenoid-operated switch 10.

Energized operating coil 81 of field relay 80 closes movable contact 82 thereof into electrical contact with stationary contact 83 to complete an energizing circuit for field coil 9 of generator 5 through a circuit which may be traced from the positive-polarity terminal of battery 2, through lead 76, movable contact 82 and stationary contact 83 of field relay 80, lead 77, field coil 9 of generator 5 and point of reference or ground potential 1 to the negative-polarity terminal of battery 2.

Energized operating coil 11 of solenoid-operated switch 10 closes movable contact 13 thereof into electrical contact with stationary contact 14 to complete an energizing circuit for cranking motor 3 which may be traced from the positive-polarity terminal of battery 2 through lead 86, movable contact 13 and stationary contact 14, now closed, of solenoid-operated switch 10, lead 28, cranking motor 3 and point of reference or ground potential 1 to the negative-polarity terminal of battery 2. Consequently, cranking motor 3 begins to crank engine 4.

With engine 4 being cranked and while it is in the running mode, the energized field coil 9 of generator 5, rotated with rotor 8, induces a three-phase potential in output coils 5a, 5b, and 5c thereof which increases in magnitude as the speed of engine 4 increases. The potential appearing across coils 5a and 5b or 5c is half-wave rectified and appears as a pulsating DC potential across junction 66 and point of reference or ground potential 1 and is of a positive polarity upon junction 66 with respect to point of reference or ground potential 1 while the terminal end of output coil 5a is of a positive polarity. This pulsating DC potential produces a pulsating DC flow through diode 70 and capacitor 65 and through resistor 67 and primary winding 61 of coupling transformer 60 in parallel to point of reference or ground potential 1 which charges capacitor 65 to a potential which is of a positive polarity upon the plate connected to junction 90 with respect to the plate connected to point of reference or ground potential 1 and produces a primary winding 61 pulsating magnetic field. Capacitor 88 is a filter capacitor connected across primary winding 61 to smooth the pulsating DC flow through primary winding 61. The primary winding 61 pulsating magnetic field induces an AC potential in secondary winding 62 of coupling transformer 60. While the polarity of the AC potential induced in secondary winding 62 is of a positive polarity at the terminal end thereof connected to gate 48 of silicon-controlled rectifier 45 with respect to the terminal end thereof connected to point of reference or ground potential 1, this potential is applied across the gate-cathode electrodes of silicon-controlled rectifier 45 in the correct polarity relationship to produce gate-cathode current flow therethrough. Consequently, as the magnitude of this potential increases with engine 4 speed, a value is reached at which it is of sufficient magnitude to produce gate-cathode current through silicon-controlled rectifier 45. As the battery 2 is connected across the anode-cathode electrodes of silicon-controlled rectifier 45 in the correct polarity relationship to produce anode-cathode current flow through a silicon-controlled rectifier through circuitry previously described, silicon-controlled rectifier 45 is triggered conductive through the anode-cathode electrodes thereof. Conducting silicon-controlled rectifier 45 effectively shunts or short circuits operating coil 21 of electric relay 20 to substantially deenergize and, consequently, disenable operating coil 21.

Upon the deenergization of operating coil 21 of electric relay 20 by conducting silicon-controlled rectifier 45, the associated normally open contacts thereof open to interrupt the energizing circuit for "hold-in" coil 12 of solenoid-operated switch 10. With "hold-in" coil 12 of solenoid-operated switch 10 deenergized, the associated normally open contacts 13 and 14 thereof open to interrupt the energizing circuit for and, consequently, automatically disconnect cranking motor 3.

At this time, movable contact 41 of electric switch 40 may be returned to the "run" position at which it is in electrical contact with stationary contacts 43 and 44.

With movable contact 41 of electric switch 40 in the "run" position, battery potential is removed from across the anode-cathode electrodes of silicon-controlled rectifier 45 as stationary contact 42 of electric switch 40 is no longer contacted by movable contact 41. However, the pulsating DC potential appearing across junction 66 and point of reference or ground potential 1 while engine 4 is in the running mode, and the charge upon capacitor 65 are applied across the anode-cathode electrodes of silicon-controlled rectifier 45 in the proper polarity relationship to maintain this device conductive through diode 70 and resistor 75, and through resistor 75, respectively, and point of reference or ground potential 1.

With this arrangement, capacitor 65 discharges through the anode-cathode electrodes of silicon-controlled rectifier 45 to maintain this device conductive over those periods during which the pulsating DC potential appearing across junction 66 and point of reference or ground potential 1 is of an insufficient magnitude to maintain holding current through silicon-controlled rectifier 45. Consequently, silicon-controlled rectifier 45 is maintained conductive while the movable contact 41 of electric switch 40 is in the "run" position and the engine 4 is in the running mode.

Should the movable contact 41 of electric switch 40 be inadvertently returned to the "crank" position bridging stationary contacts 42 and 43 after engine 4 has started and remains in the running mode, conducting silicon-controlled rectifier 45 will effectively shunt or short circuit operating coil 21 of electric relay 20 to prevent the energization thereof, consequently, cranking motor 3 will not be energized as the energizing circuit for operating coil 11 of solenoid-operated switch 10 is maintained open by the normally open contacts of electric relay 20.

In the event engine 4 should stall or should be turned off by moving movable contact 41 of electric switch 40 to the "off" position, the pulsating DC potential would no longer be present across junction 66 and point of reference or ground potential 1, consequently, silicon-controlled rectifier 45 would become nonconductive upon the completion of the discharge of capacitor 65. With silicon-controlled rectifier 45 in the nonconducting state, the circuit is prepared for the next engine "crank."

While specific electrical devices and polarities have been set forth in the specification, it is to be specifically understood that alternate electrical devices having similar electrical characteristics with compatible polarities may be substituted therefor without departing from the spirit of the invention.

I claim:

1. A cranking motor automatic disconnect and lockout circuit comprising in combination with a source of DC potential, a cranking motor connected thereacross through the normally open contacts of a solenoid-operated switch having at least one operating coil, an engine to be cranked thereby and an electric generator driven by the engine,
    a relay having an operating coil and two normally open contacts,
    means for connecting said operating coil of said solenoid-operated switch across said source of DC potential through said normally open contacts of said relay,
    an electric switch,
    means including said electric switch for connecting said operating coil of said relay across said source of DC potential,
    a silicon-controlled rectifier having anode, cathode, and gate electrodes,
    means for connecting said anode-cathode electrodes of said silicon-controlled rectifier across said operating coil of said relay,
    a transformer having primary and secondary windings,
    a capacitor,
    means for applying at least a portion of the output potential of said electric generator across said primary winding of said transformer and said capacitor in parallel,
    means for connecting said secondary winding of said transformer across said gate-cathode electrodes of said silicon-controlled rectifier, and means for connecting said capacitor across said anode-cathode electrodes of said silicon-controlled rectifier in a polarity relationship to maintain anode-cathode current flow therethrough.

2. A cranking motor automatic disconnect and lockout circuit comprising in combination with a source of DC potential, a cranking motor connected thereacross through the normally open contacts of a solenoid-operated switch having at least one operating coil, an engine to be cranked thereby and a three-phase alternator driven by the engine,
    a relay having an operating coil and two normally open contacts,
    means for connecting said operating coil of said solenoid-operated switch across said source of DC potential through said normally open contacts of said relay,
    an electric switch,
    means including said electric switch for connecting said operating coil of said relay across said source of DC potential,
    a silicon-controlled rectifier having anode, cathode and gate electrodes,
    means for connecting said anode-cathode electrodes of said silicon-controlled rectifier across said operating coil of said relay,
    a transformer having a primary and a secondary winding,
    a capacitor,
    a three-phase diode bridge-type rectifier circuit comprising the parallel combination of three pairs of series-connected diodes and two DC output circuit means for rectifying the output of said three-phase alternator,
    means for connecting said primary winding of said transformer across a junction between any two of said series-connected diodes and a selected one of said DC output circuit means of said rectifier circuit,
    means for connecting said capacitor across a junction between any two of said series-connected diodes and a selected one of said DC output circuit means of said rectifier circuit,
    means for connecting said secondary winding of said transformer across said gate-cathode electrodes of said silicon-controlled rectifier, and
    means for connecting said capacitor across said anode-cathode electrodes of said silicon-controlled rectifier in a polarity relationship to maintain anode-cathode current flow therethrough.